United States Patent [19]
Daly et al.

[11] Patent Number: 5,590,405
[45] Date of Patent: Dec. 31, 1996

[54] COMMUNICATION TECHNIQUE EMPLOYING VARIABLE INFORMATION TRANSMISSION

[75] Inventors: John J. Daly, Neshanic Station; Herman F. Haisch, Holmdel; Peter Kapsales, Middletown; Bala Krishnamurthy, Morganville; Richard A. Miska, Belle Mead; Joseph K. Nordgaard, Fair Haven; Carl E. Walker, Red Bank, all of N.J.

[73] Assignee: Lucent Technologies Inc., Murray Hill, N.J.

[21] Appl. No.: 146,372

[22] Filed: Oct. 29, 1993

[51] Int. Cl.$^6$ .................................................. H04Q 7/20
[52] U.S. Cl. .................... 455/54.1; 370/468; 455/52.1; 455/63; 371/5.5
[58] Field of Search ............... 455/63, 33.1, 33.2, 455/53.1, 54.1, 10, 52.1, 52.3; 370/17, 84, 79; 371/5.5

[56] References Cited

U.S. PATENT DOCUMENTS

| | | | |
|---|---|---|---|
| 4,825,193 | 4/1989 | Siwiak et al. | 340/311.1 |
| 4,833,701 | 5/1989 | Comroe et al. | 379/60 |
| 4,868,560 | 9/1989 | Oliwa et al. | 340/825.44 |
| 4,928,096 | 5/1990 | Leonardo et al. | 340/825.44 |
| 5,010,317 | 4/1991 | Schwendeman et al. | 340/311.1 |
| 5,070,536 | 12/1991 | Mahany et al. | 370/84 |
| 5,142,533 | 8/1992 | Crisler et al. | 370/95.1 |
| 5,313,467 | 5/1994 | Varghese et al. | 370/84 |
| 5,321,541 | 6/1994 | Freitas et al. | 370/84 |
| 5,361,399 | 11/1994 | Linquist et al. | 455/54.1 |

*Primary Examiner*—Edward F. Urban
*Attorney, Agent, or Firm*—Robert P. Marley

[57] ABSTRACT

A communication method wherein rate of information transfer with a given signal transmitted or received at a transceiver node is dynamically varied as a function of the relative quality of the transmission environment. The method employs a responsive buffering process at each communication node that permits this rate to be varied somewhat independently of the rate at which information is transferred to or from the transceiver node. In a particular application, the invention permits information to be exchanged between a wireless signal having a variable error correction bandwidth and a fixed bandwidth data stream.

12 Claims, 2 Drawing Sheets

COMMUNICATION TECHNIQUE EMPLOYING VARIABLE INFORMATION TRANSMISSION

TECHNICAL FIELD

The invention relates two-way messaging systems, and in particular, to remote two-way messaging systems.

BACKGROUND OF THE INVENTION

For field managers, as well as field sales and service personnel, the ability to conveniently and rapidly transmit and/or receive messages to and from a central data base is essential. However, the mobile nature of these and many other occupations makes access to wireline terminals impractical, if not impossible. Modern wireless two-way messaging systems, such as commercial remote data terminal networks, are directed to supporting the mobile data messaging needs of such professionals as they travel about the coverage area of the messaging network. These networks typically operate within the frequency range reserved for cellular communications, and require a bandwidth on the order of 25 MHz.

Within such networks, users employ transportable field transceivers to contact one or more regional processors, and thereby gain access to the network and a central application host/database. Typically, as a user moves about the coverage area, signals traveling between the mobile and regional processors are subject to fading (i.e., random signal variations usually induced by atmospheric conditions and/or the surrounding topography). These variations can introduce bit errors into the data being passed to and from the mobile transceiver. The standard protocols and relatively unintelligent regional processors employed within the networks dictate that a substantial fixed portion of the transmission bandwidth be dedicated to error correction. This naturally reduces the bandwidth available to a user for sending and receiving information. The error correction afforded by this information bandwidth reduction is indeed necessary when a user is in an area where fading is evident. However, in an environment where fading is minimal or zero, successful transmission and reception of information can be accomplished with reduced error correction. If the percentage of bandwidth dedicated to error correction were to be dynamically adjusted in response to the relative fading a user was experiencing, the information bandwidth could be maximized. This type of dynamic bandwidth management is employed within certain facsimile machine protocols, so that if the telephonic connection between two facsimile machines is of high quality (i.e., induces minimal bit errors) the amount of error correction is reduced, and the bandwidth afforded to information transmission is increased. Unfortunately, current wireless two-way data networks are unable to employ dynamic bandwidth management. In order to accommodate dynamic variations in the information bandwidths of the field transceivers employed within a wireless two-way data network, the information bandwidths of the associated regional processors and central application host/database would have to be responsively varied in a similar dynamic manner. The transceivers, processors and protocols utilized within present wireless two-way data networks are simply not adapted to support such bandwidth dynamics.

SUMMARY OF THE INVENTION

The aforementioned problems and limitations are solved, in accordance with the principles of the invention, by providing a communication method wherein rate of information transfer with a given signal transmitted or received at a transceiver node is dynamically varied as a function of the relative quality of the transmission environment. The method employs a responsive buffering process at each communication node that permits this rate to be varied somewhat independently of the rate at which information is transferred to or from the transceiver node. In a particular application, the invention permits information to be exchanged between a wireless signal having a variable error correction bandwidth and a fixed bandwidth data stream.

DETAILED DESCRIPTION OF THE INVENTION

Figure 1:
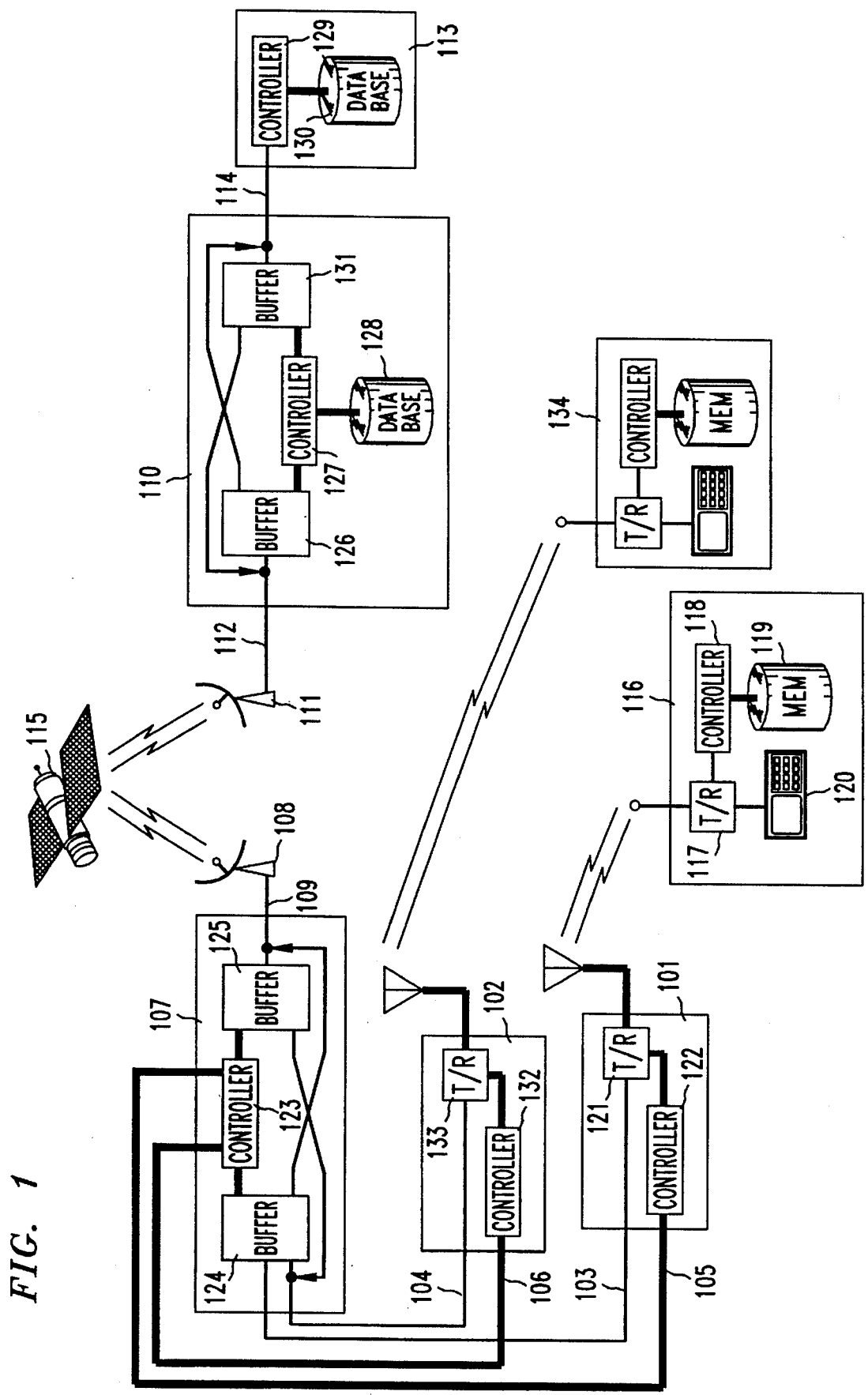
FIG. 1 shows, in simplified block diagram form, a wireless two-way messaging system incorporating a particular embodiment of the invention.

FIG. 1 is a simplified block diagram showing a wireless two-way messaging system incorporating a particular embodiment of the invention. As shown, base transceivers 101 and 102 are connected via information channel wirelines 103 and 104, and control wirelines 105 and 106 to regional control processor ("RCP") 107, and RCP 107 is connected to satellite hub 108 via wireline 109. Each base transceiver is adapted to receive, transmit and process radio signals having a fixed channel bandwidth B. Network Gateway Controller ("NGC") 110 is shown to be connected to satellite hub 111 by wireline 112, and to application host/database ("AH/D") 113 by wireline 114. The communication link provided by satellite hubs 108 and 111 and direct broadcast satellite 115 is referred to as the backbone message transport ("BMT") link. Field transceivers 116 and 134 are shown to be located in the vicinity of base transceiver 101. Field transceiver 116 is adapted to transmit and receive encoded radio signals having a fixed channel bandwidth B. A portion of this bandwidth, designated I, is employed to carry information, and the remainder of bandwidth B, designated E, is used to provide error correction for the information portion of the signal. Typically, forward error correction would be employed, but other coding schemes could also be used. The system illustrated in FIG. 1 can be viewed as a communication network wherein a transmission form end to end would involve a minimum of six nodes (a field transceiver, a base transceiver, an RCP, a BMT link, an NGC and an AH/D).

For a particular method of practicing the invention, field transceiver 116 initiates a request to receive data from AH/D 113 by transmitting an encoded radio signal of bandwidth B. Such a request would include information as to the identity of the field transceiver and the particular data and AH/D being queried. As shown in FIG. 1, field transceiver 116 includes radio transmitter/receiver ("T/R") 117, controller 118, memory 119, and interface 120. Since this is an initial transmission, controller 118 would instruct transmit/receive unit 118 to employ a predetermined portion of bandwidth B for the purposes of error correction (the predetermined portion, designated E1, would be set as a function of information retrieved by controller 118 from memory 119). The encoded signal (containing information of bandwidth $B-E_1$, and error correction of bandwidth $E_1$) would then be transmitted from T/R 117 for reception by a base transceiver.

The signal transmitted by field transceiver 116 is received and processed by base transceiver 101. Upon receipt of the signal by T/R 121, controller 122 within base transceiver 101 performs a qualitative assessment of the signal. If it is determined that present transmission environment requires a level of error correction higher than that afforded by bandwidth $E_I$ (i.e., radio channel quality is poor), or if an information reduction ("IR") signal is received from RCP 107, a message instructing field transceiver 116 to increase the error correction bandwidth to an appropriate level is generated by controller 122 and transmitted by base transceiver 101. Controller 118 of field transceiver 116 responds by increasing the bandwidth devoted to error correction to some value $E_{1+}$ (where $E_{1+} > E_1$), and re-transmits the previously transmitted information at a reduced bandwidth of $B-E_{1+}$. All communications between field transceiver 116 and base transceiver 101 will be carried out at this increased error correction level until an assessment of the signal received at base transceiver 101 indicates that a different level of error correction (either higher or lower) is merited. If, however, the assessment of the initial signal received from field transceiver 116 indicates that the present transmission environment would tolerate signals with a lesser degree of error correction controller 122 generates a message instructing field transceiver 116 to decrease the error correction bandwidth to a value of $E_{1-}$ (where $E_{1-} < E_1$). This message is then transmitted to field transceiver 116 by base transceiver 101; although transmission of this message may be prohibited if controller 122 receives an IR signal from RCP 107 via control wireline 105. However, assuming controller 122 is not receipt of such an IR signal, communications between field transceiver 116 and base transceiver 101 will be carried out using this decreased error correction level until an assessment of the signal received at base transceiver 101 indicates that a different level of error correction is merited, or until controller 122 receives an IR signal from RCP 107. Naturally, if the quality of the initial signal received at base transceiver 101 is found to be commensurate with the level of error correction provided by bandwidth $E_1$, there is no need to alter the information/error correction bandwidth proportions for future communications, and no message regarding such need be sent to field transceiver 116 until an assessment of the received signal at base transceiver 101 indicates otherwise.

Naturally, as the ratio of error correction bandwidth versus information bandwidth is altered, the rate at which base transceiver 101 receives field transceiver 116's request for data from AH/D 113 varies. As a result, the rate at which data travels from base transceiver 101 to RCP 107 along information channel wireline 103 fluctuates. The data received by RCP 107 on information channel wireline 103 is passed to wireline 109 and the BMT link (which includes satellite 115, and satellite hubs 108 and 111). RCP 107 functions to provide an intelligent buffer between the fluctuating rate data arriving on information channel wireline 103 and the fixed data rate of the BMT link. RCP 107 also embeds information reflecting the aggregate rate at which data is being collected from base transceivers, and the fullness of buffer 125, into the data stream transmitted along wireline 109.

As shown in FIG. 1, RCP 107 includes controller 123, and buffers 124 and 125. Controller 123 functions to monitor the rate at which data is being sent to and from the various base transceivers connected to buffer 124, as well as the rate at which data is being sent to buffer 125 from the BMT link.

Via control wireline 105, controller 123 receives information from controller 122 regarding the rate at which data from base transceiver 101 will be sent to buffer 124. If controller 123 determines that the aggregate incoming data rate to buffer 124 is equal to the fixed rate at which data may be passed through the BMT link, the incoming data is multiplexed or packetized within RCP 107, and then passed to satellite hub 108 via wireline 109. If, however, controller 123 determines that the aggregate incoming data rate to buffer 124 is less than the fixed data rate of the BMT link, RCP 107 will effectively elevate the data rate by adding bits to the data stream before it is transmitted along wireline 109. These additional bits are inserted in a way that will not affect the information carded by the data stream (a practice commonly referred to as "bit stuffing"). Contrastingly, if controller 123 determines that the aggregate incoming data rate to buffer 124 is in excess of the maximum BMT link data rate, the incoming data will be stored in buffer 124 as it arrives, and allowed to pass through to wireline 109 at a rate equal to the maximum BMT link data rate. This will of course result in an accumulation of information within buffer 124 as the data rate in is greater than the data rate out. The period over which RCP 107 can sustain such an uneven data flow is a function of the size of buffer 124 and the aggregate rate at which data continues to enter buffer 124.

If controller 123 determines that buffer 124 is in danger of becoming full (a condition that would result in the loss of any data subsequently transmitted to RCP 107 from base transceivers), it sends an IR signal to base transceiver or transceivers currently transmitting information to RCP 107 (in this case, base transceiver 101). This IR signal causes controller 122 within base transceiver 101 to increase the bandwidth being used for error correction in communicating with field transceiver 116, thereby reducing the information bandwidth. This effectively diminishes the rate at which base transceiver 101 will transfer information to buffer 124, and allows for that buffer to be emptied. When controller 123 determines that buffer 124 is no longer in danger of becoming full, it will discontinue the IR signal being transmitted to base transceiver 101. Controller 122 will then be free to reduce the bandwidth devoted to error correction to a level suitable for the transmission environment.

After passing through buffer 124 and the BMT link, the signal from RCP 107 (which includes information as to the identity of field transceiver 116 and the particular data and AH/D being queried, as well as information reflecting the aggregate rate at which data is being collected by RCP 107, and the fullness of buffer 125) arrives at NGC 110 via wireline 112. NGC 110 depacketizes or demultiplexes the received signal, depending upon the encoding method employed by RCP 107, and routes the information contained in the signal to buffer 126. Controller 127 retrieves information relating to the identity of field transceiver 116 and AH/D 113 (the particular AH/D being queried) from the buffered signal and compares it to a listing of approved subscribers stored in database 128. If field transceiver 116 is found to be a subscriber approved to receive information from AH/D 113, controller 127 allows the request for information to be passed from buffer 126 to AH/D 113 at a fixed rate via wireline 114. This fixed rate is set by controller 127 as a function of stored information retrieved from database 128. Database 128 contains information regarding the particular data transmission capabilities of any and all AH/Ds connected to NGC 110. Controller 129 within AH/D 113, in response to the received request, retrieves the needed information from database 130, and transmits it at a fixed rate to buffer 131 via wireline 114. Controller 129 also embeds information as to the identity of the intended recipient of the information (field transmitter 116) into the data stream transmitted along wireline 114.

Controller 127 transfers the data received by buffer 131 to the link BMT via wireline 112. This data transfer must take place at the fixed rate required by the BMT link. As this fixed BMT rate is not necessarily equal to the rate at which AH/D 113 transfers data, buffer 131 is needed. If controller 127 determines that the incoming data rate to buffer 131 is less than the fixed data rate of the BMT link, NGC 110 will elevate the data rate by bit stuffing. Controller 127 may pause before allowing the data stored in buffer 131 to be transferred to the BMT link. This pause would be entered into if controller 127 had received a message indicating that buffer 125 of RCP 107 was nearly full (such information was included in the data requesting signal received from RCP 107). The pause may be for a fixed period or until controller 127 receives information from RCP 107 that buffer 125 was no longer in danger of becoming full. In any case, the data is transferred from the BMT link to buffer 125 via wireline 109.

Upon receipt of the data intended for field transceiver 117 being stored in buffer 125, controller 123 causes it to be transferred along information channel wireline 103 to base transceiver 101. The rate at which the data is transferred to base transceiver 101 is equal to the rate at which data was last received by RCP 107 from base transceiver 101. This data rate is commensurate with the error correction/information bandwidth ratio employed by field transceiver 116 in making the request for data. By returning data to base station 101 along information channel wireline 103 at this rate, a signal carrying the requested information may be readily transmitted back to transceiver 116 employing the same error correction/information bandwidth ratio—A level of error correction suitable for the present transmission environment and overall system data load.

In the above transmission scenario, it was assumed that field transceiver 116 was transmitting in an area serviced by base transceiver 101. As multiple base transceivers may be employed within a wireless two-way messaging system, signals transmitted to and from a field transceiver may be received by different base transceivers (such as base transceiver 102) depending upon the location of a field transceiver. Base transceiver 102, which operates in manner similar to that of base transceiver 101, is shown in FIG. 1 to include controller 132 and T/R 133. The reception and passing of a received signal among various base transceivers can be managed in a fashion similar to that of a cellular telephone signal being passed from cell to cell. In addition, as multiple base transceivers can be employed, RCP 107 may simultaneously receive more than one signal originating from more than one field transceiver, or receive more than one signal from the BMT link intended for more than one field transceiver. This additional information flowing through the system merely adds to the aggregate information flow and is compensated for through the buffering and information reduction processes described above.

Figure 2:
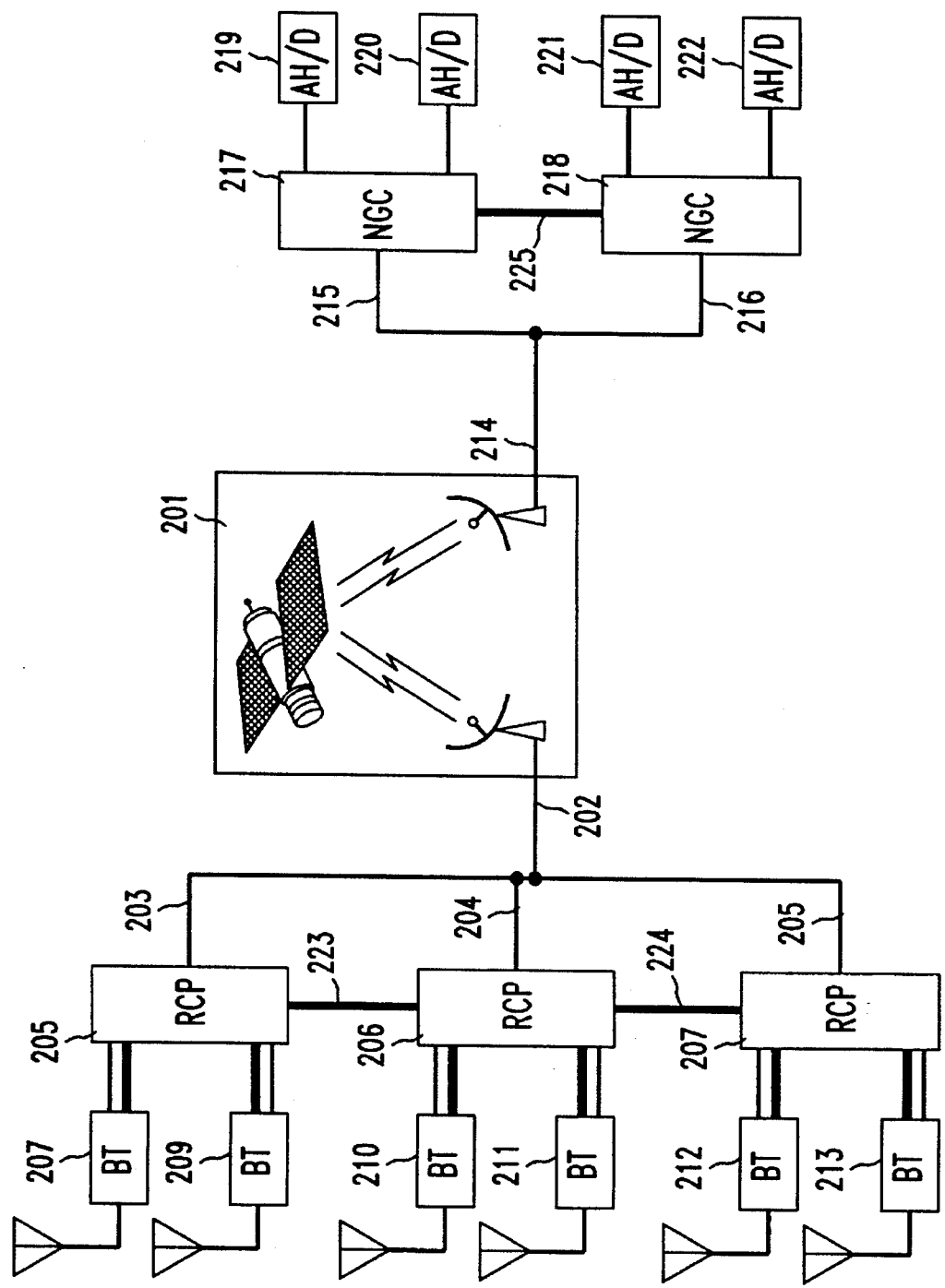
FIG. 2 shows, in simplified block diagram form, a wireless two-way messaging system incorporating a particular embodiment of the invention.

FIG. 2 is a simplified block diagram showing a second wireless two-way messaging system incorporating components similar to those shown in FIG. 1. The system includes BMT 201 which is linked by wirelines 202, 203, 204 and 205 to RCPs 205, 206 and 207. Each of the RCPs is shown to be linked by control and information channel wirelines to two base transceivers, which are numbered 208 through 213. BMT 201 is also shown to be linked by wirelines 214, 215 and 216 to NGCs 217 and 218. Each of these NGCs is linked by wireline to two AD/Hs, numbered 219 through 222. In practicing a particular embodiment of the invention within the system of FIG. 2, communications are carried out between the base transceivers and various field transceivers (not shown). The field transceivers exchange information with the AH/Ds via radio transmissions, wirelines, base transceivers, NGCs and a BMT in a manner similar to that described for the system of FIG. 1.

The major difference in operation between the system of FIG. 2 and the system of FIG. 1 is an additional level of control facilitated by the control wirelines 223, 224 and 225. As shown, wirelines 223 and 224 connect all of the RCPs within the system together, thereby allowing the controllers within each of the RCPs to share information regarding the present level at which each is allowing data to be passed to wireline 202 for transmission to BMT 201. By allowing each of the RCPs to track the rate of information transmission of the other two RCPs, the aggregate data rate flowing along wireline 202 can be kept to a level matching the fixed data rate of BMT 201. To regulate this aggregate data rate, the buffers within each of RCPs employ variable buffering to allow the rate of data exiting each RCP to be varied somewhat independently of the rate at which data is received by a given RCP from any associated base transceivers (the buffering is performed in a manner similar to that described for RCP 107 of FIG. 1).

Control wireline 225 provides a link between NGC 217 and NGC 218. This link allows the controllers within the NGCs to share information regarding the level at which each is allowing data to be passed to BMT 210 via wireline 214. Each of the NGCs can then determine the aggregate rate at which dam is flowing along wireline 214. By utilizing the buffers contained within each NGC, the controllers can regulate this aggregate data flow to matching the fixed data rate of BMT 201 (this inter-NGC buffering is performed in a manner similar to the buffering described for RCP 107 of FIG. 1). The inter-NGC buffering is performed in addition to the any other buffering or information reduction processes normally carried out within an NGC (such as those described above for NGC 110 of FIG. 1).

The above-described invention provides a practical technique for effecting variable error-correction wireless communications within a communication system, wherein the bandwidth dedicated to wireless signal error correction is varied in response to fading within the transmission environment, and the rate at which information is accumulating within the nodes of the communication system. It will be understood that the particular methods described are only illustrative of the principles of the present invention, and that various modifications could be made by those skilled in the an without departing from the scope and spirit of the present invention, which is limited only by the claims that follow. One such modification would include applying the method of this invention to a systems employing a wireline BMT link.

We claim:

1. A method for transmitting information within a communication system comprising an application node, a base transceiver node and a field transceiver node; said method comprising the steps of:

transmitting information between said field transceiver node and said base transceiver node at a variable data rate via a first fixed bandwidth information channel, wherein said variable data rate is a function of the transmission quality afforded by said first fixed bandwidth information channel, and wherein, prior to the transmission of said information between said field transceiver node and said base transceiver node, the effective rate of said variable data rate information is elevated via bitstuffing or reduced via buffering to match the transmission rate supported by said first fixed bandwidth information channel;

transmitting, from said base transceiver node to said application node, a signal indicative of the present variable data rate at which information is being transmitted between said field transceiver node and said base transceiver node via said first fixed bandwidth information channel; and varying the data rate at which information is transmitted between said application node and said base transceiver node via a second fixed bandwidth information channel as a function of said received signal indicative of said variable data rate of transmission between said field transceiver node and said base transceiver node, wherein, prior to the transmission of said information between said application node and said base transceiver node, the effective rate of said variable data rate information is elevated via bitstuffing or reduced via buffering to match the transmission rate supported by said second fixed bandwidth information channel.

2. The method of claim 1 wherein said data rate at which information is transmitted via said second fixed bandwidth information channel is equal to said present variable data rate for transmissions via said first fixed bandwidth information channel.

3. The method of claim 1 wherein said information transmitted between said application node and said base transceiver node is then transmitted from said base transceiver node to said field transceiver node at a data rate equal to said present variable data rate for transmissions from said field transceiver node to said base transceiver node.

4. A method for transmitting information within a communication system comprising an field transceiver node, an base transceiver node and an application node; said method comprising the steps of:

transmitting information between said field transceiver node and said base transceiver node at a variable data rate via a wireless fixed bandwidth information channel, wherein said variable data rate is a function of the transmission quality afforded by said wireless fixed bandwidth channel, and wherein, prior to the transmission of said information between said field transceiver node and said base transceiver node, the effective rate of said variable data rate information is elevated via bitstuffing or reduced via buffering to match the transmission rate supported by said wireless fixed bandwidth information channel;

transmitting, from said base transceiver node to said application node, a signal indicative of the present variable data rate at which information is being transmitted between said field transceiver node and said base transceiver node via said wireless fixed bandwidth information channel; and varying the rate at which information is transmitted between said application node and said base transceiver node as a function of said received signal indicative of said present variable data rate for transmissions between said field transceiver node and said base transceiver node.

5. The method of claim 4 wherein said rate at which information is transmitted between said application node and said base transceiver node is equal to said present variable data rate for transmissions via said wireless fixed bandwidth information channel.

6. The method of claim 4 wherein said information transmitted between said application node and said base transceiver node is then transmitted from said base transceiver node to said field transceiver node via a wireless fixed bandwidth information channel at a rate equal to said present variable data rate for transmissions from said field transceiver node to said base transceiver node.

7. The method of claim 4 wherein said field transceiver node includes a remote data terminal.

8. A method for transmitting information within a communication system comprising:

a wireless field transceiver adapted to transmit and receive information via a first channel having a fixed bandwidth;

a base transceiver adapted to transmit information to, and receive information from said wireless field transceiver via said first channel, and a remote data base adapted to transmit information to and receive information from said base transceiver via a second fixed bandwidth channel;

said method comprising the steps of:

transmitting information between said wireless field transceiver and said base transceiver at a variable data rate via said first channel, said variable data rate being a function of the transmission quality afforded by said first channel, wherein, prior to the transmission of said information between said wireless field transceiver and said base transceiver, the effective rate of said variable data rate information is elevated via bitstuffing or reduced via buffering to match the transmission rate supported by said fixed bandwidth of said first channel;

transmitting, from said base transceiver to said remote data base, a signal indicating the present variable data rate at which information is being transmitted between said wireless field transceiver and said base transceiver; and transmitting information between said remote data base and said base transceiver, via said second channel, at a data rate determined as a function of said present variable data rate of transmission between said wireless field transceiver and said base transceiver, wherein, prior to the transmission of said information between said remote data base and said base transceiver, the effective rate of said variable data rate information is elevated via bitstuffing or reduced via buffering to match the transmission rate supported by said fixed bandwidth of said second channel.

9. The method of claim 8 wherein said rate determined as a function of said present variable data rate for transmissions between said wireless field transceiver and said base transceiver is equal to said present variable data rate for transmissions between said wireless field transceiver and said base transceiver.

10. The method of claim 8 wherein said information transmitted between said remote data base and said base transceiver is then transmitted from said base transceiver to said wireless field transceiver at a rate equal to said present variable data rate for transmissions between said remote data base and said base transceiver.

11. The method of claim 8 wherein said wireless field transceiver includes a remote data terminal.

12. A method for transmitting information within a communication system comprising:

a plurality of wireless field transceivers, each adapted to transmit and receive information via a separate channel having a fixed bandwidth;

a plurality of base transceivers, each adapted to transmit information to, and receive information from said plurality of wireless field transceivers via said separate fixed bandwidth channels, and a plurality of remote data bases adapted to transmit information to and receive information from said plurality of base transceivers via a second fixed bandwidth channel, and further adapted to transmit information to each of said plurality of wireless field transceivers;

said method comprising the steps of:

transmitting information between at least one of said plurality of wireless field transceivers and at least one of said plurality of base transceivers, each of said transmissions being performed at a variable data rate via one of said separate fixed bandwidth channels, wherein the particular variable data rate for transmissions via each of said separate fixed bandwidth channels is a function of the transmission quality afforded by each separate fixed bandwidth channel, and wherein, prior to the transmission of said information between at least one of said plurality of wireless field transceivers and at least one of said plurality of base transceivers, the effective rate of said variable data rate information is elevated via bitstuffing or reduced via buffering to match the transmission rate supported by each of said separate fixed bandwidth channels;

transmitting from at least one of said plurality of base transceivers to at least one of said plurality of remote data bases, via said second fixed bandwidth channel, a signal indicating the present variable data rate at which information is being transmitted between each of said plurality of wireless field transceivers and said one of said plurality of base transceivers; and transmitting information between at least one of said plurality of remote data bases and at least one of said plurality of base transceivers, at a data rate determined as a function of said present variable data rates for transmissions between said plurality of field transceivers and each of said base transceivers, wherein, prior to the transmission of said information between at least one of said plurality of remote data bases and at least one of said plurality of base transceivers, the effective rate of said variable data rate information is elevated via bitstuffing or reduced via buffering to match the transmission rate supported by said second fixed bandwidth channel.

* * * * *